United States Patent
Soucy

[11] Patent Number: 5,596,981
[45] Date of Patent: Jan. 28, 1997

[54] SOLAR DEVICE AND METHOD FOR ASSEMBLY

[76] Inventor: Paul B. Soucy, 119 West St., Methuen, Mass. 01844

[21] Appl. No.: 93,464

[22] Filed: Jul. 19, 1993

[51] Int. Cl.⁶ ........................................ F24J 2/46
[52] U.S. Cl. .................... 126/704; 126/706; 126/569; 126/707; 126/708; 126/710
[58] Field of Search ..................... 126/704, 706, 126/569, 707, 708, 710

[56] References Cited

U.S. PATENT DOCUMENTS

| | | | |
|---|---|---|---|
| 3,990,201 | 11/1976 | Falbel . | |
| 4,201,195 | 5/1980 | Sakhuja . | |
| 4,201,196 | 5/1980 | Zani | 126/706 |
| 4,215,677 | 8/1980 | Erickson | 126/704 X |
| 4,278,074 | 7/1981 | Urosherich | 126/704 X |
| 4,282,856 | 8/1981 | Stehl et al. | 126/706 |
| 4,289,113 | 9/1981 | Whittemore | 126/704 X |
| 4,300,601 | 11/1981 | Steinberg . | |
| 4,403,600 | 9/1983 | Morrison et al. . | |
| 4,446,851 | 5/1984 | Grose . | |
| 4,498,265 | 2/1985 | Leflar et al. | 126/704 X |
| 4,559,924 | 12/1985 | Wilhelm | 126/706 X |
| 4,655,195 | 4/1987 | Boynton . | |

OTHER PUBLICATIONS

Article Alex Wilson; Window Technology: Part I; No Pane, No Gain; "Popular Science"; Jun. 1993, pp. 92–98.

*Primary Examiner*—Larry Jones
*Attorney, Agent, or Firm*—Ellen C. Childress

[57] ABSTRACT

A solar collector and a method of manufacture is disclosed. The solar collector frame has internally oriented projections for positioning a light transmissive cover, absorber plate, insulation and base to form an enclosure. To provide for maximum active or passive collection efficiency, by increasing resistance to heat flow, an easily maintained evacuated cover is disclosed. The solar collector can be economically manufactured and can be on-site fabricated, and adapted for single or multiple installation in original or retrofit applications in a building with minimal structural modification.

21 Claims, 12 Drawing Sheets

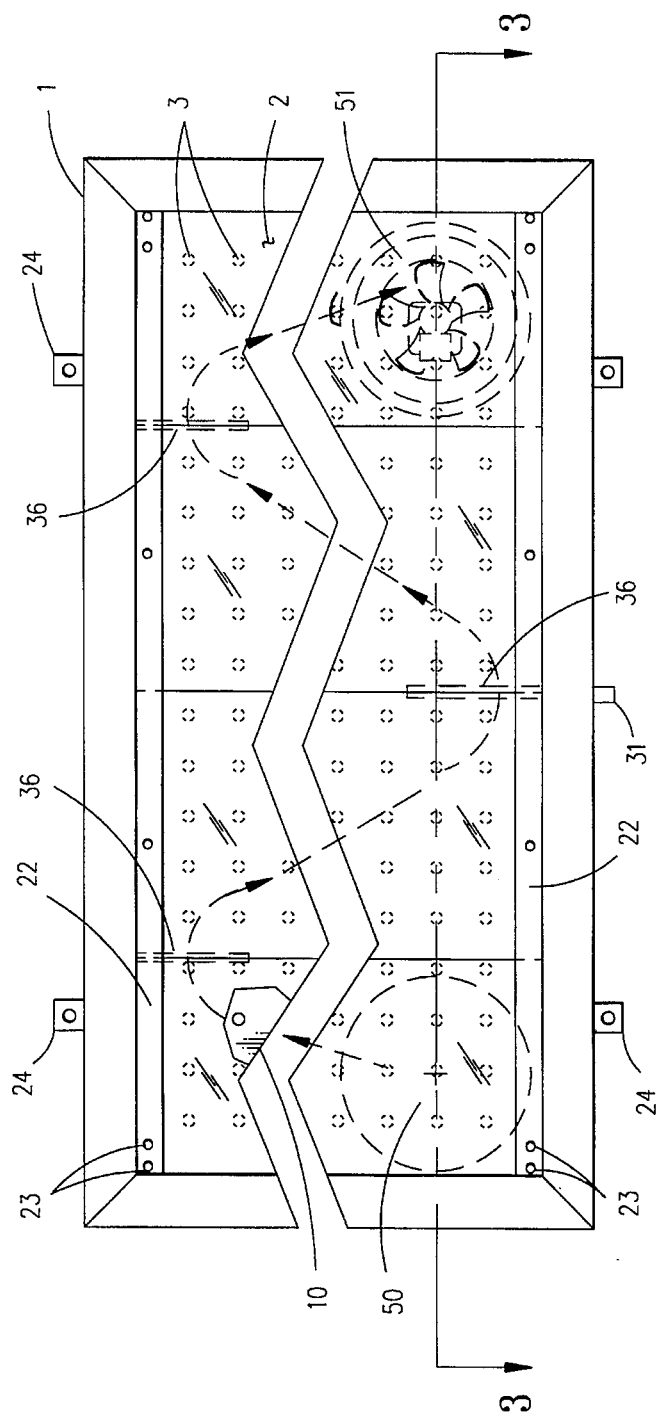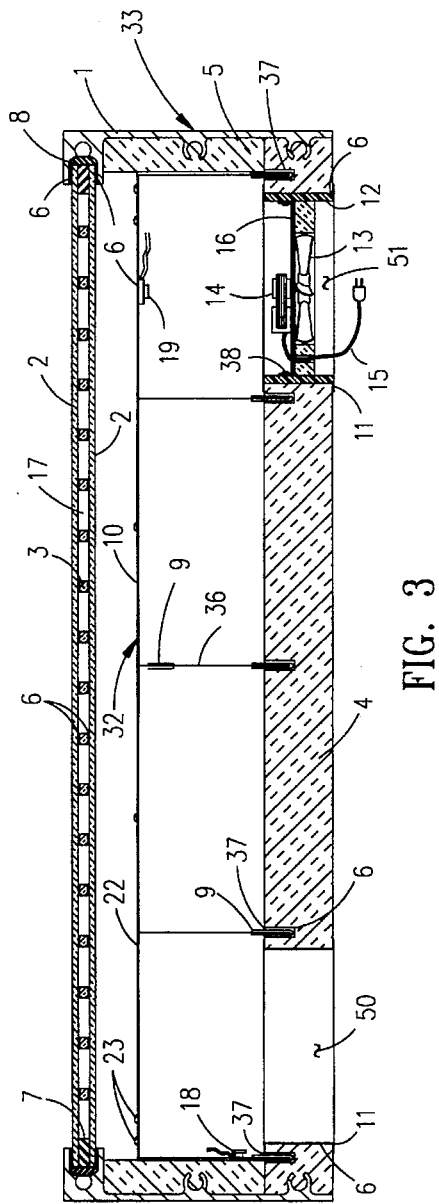
FIG. 2
FIG. 3

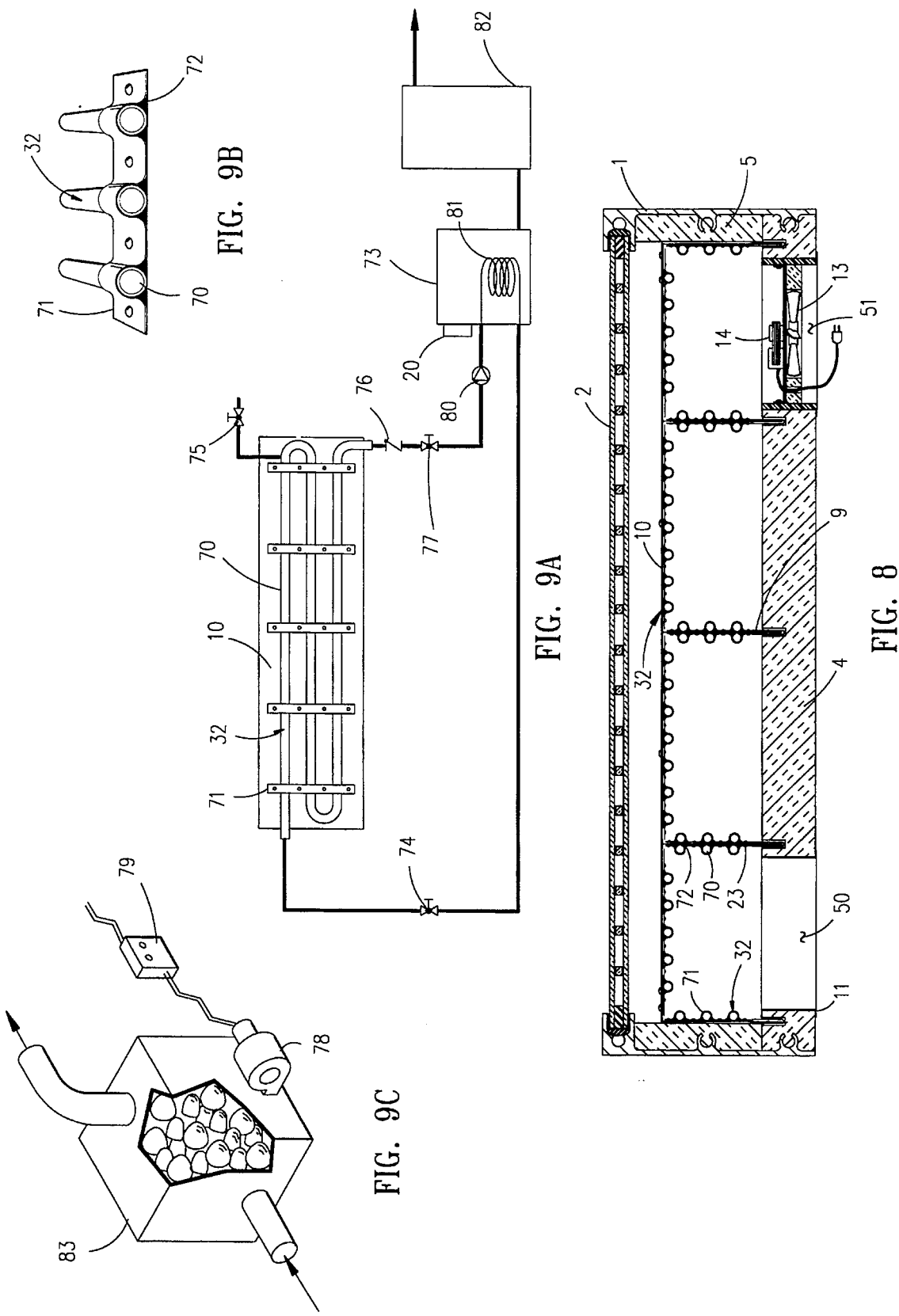

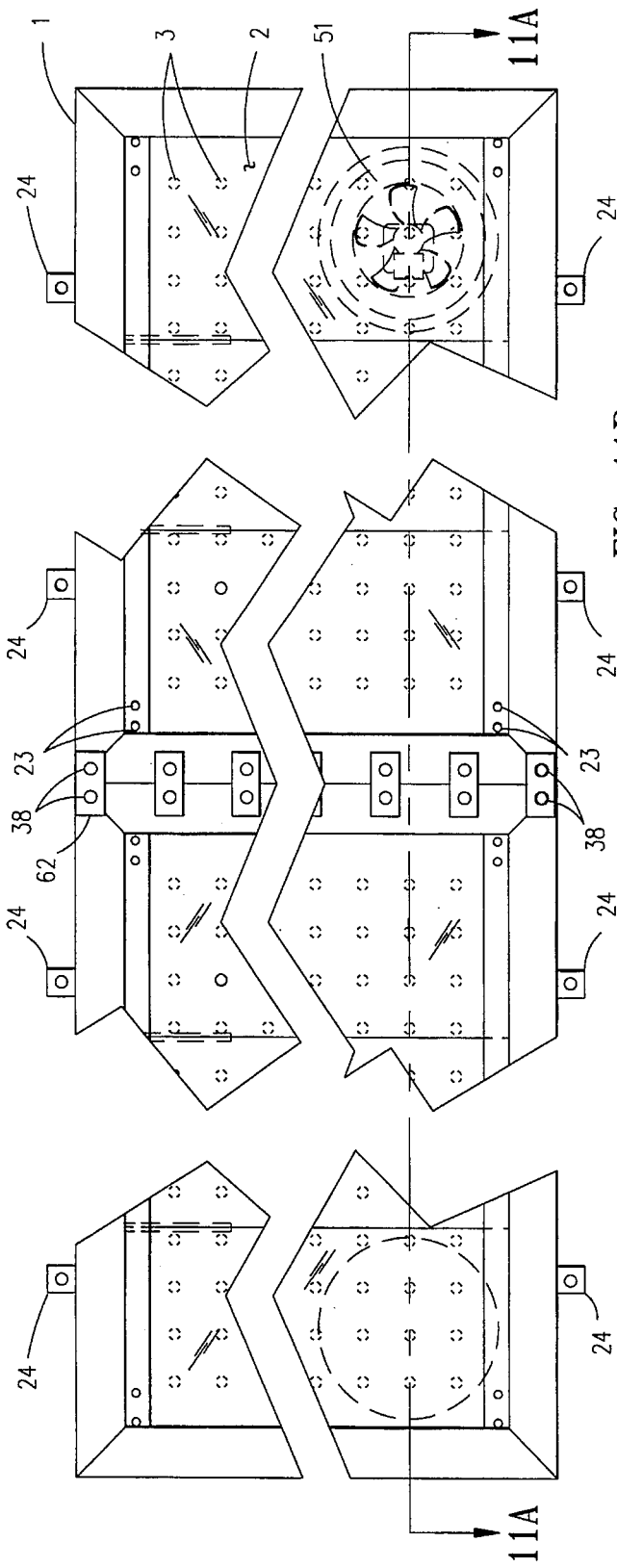
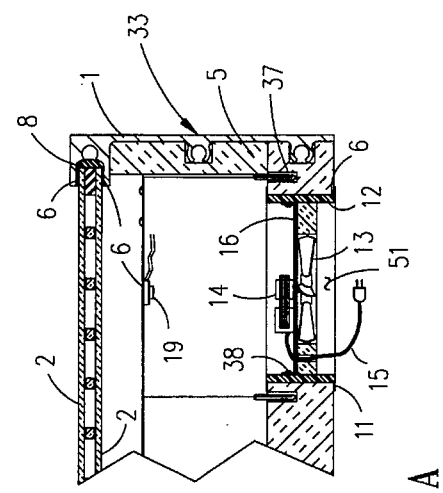
FIG. 11B
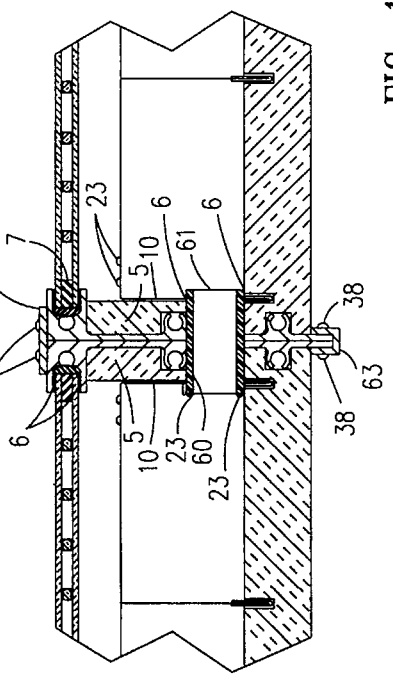
FIG. 11A
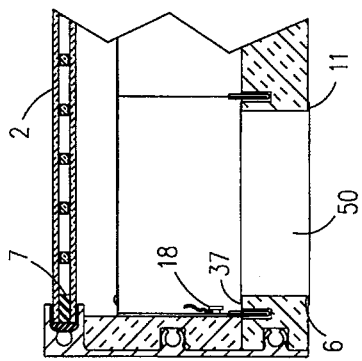

SOLAR DEVICE AND METHOD FOR ASSEMBLY

FIELD OF THE INVENTION

This invention relates to solar collectors and glazings particularly to solar air heating and methods for manufacture.

BACKGROUND OF THE INVENTION

Solar energy is universally available. Sunshine striking the earth on a typical day is estimated to be sufficient to heat millions of homes, potentially conserving substantial fossil fuel and corresponding costs.

Although solar energy is abundant, harnessing it is limited by available technology. Numerous active and passive solar collector systems for residential, commercial and industrial applications have been proposed; however, widespread acceptance of solar collector systems is restricted by high initial, operating and maintenance costs which result in a long payback period. Costly suitable solar collection materials and fabrication techniques, make their purchase uneconomical. Other problems associated with current solar energy collectors are difficult, expensive or impractical retrofitting to existing structures; bulkiness, weight, size and unaesthetic appearance; unsuitability for on-site assembly and installation by building contractors and the do-it-yourself handyperson; requirement of thermal mass, complicated circulation equipment and other accessories for operation; inflexibility for heating selected spaces; requirements for multiple glazings, thick insulating materials, rubber gaskets and other heat loss reduction materials.

Some collectors rely on tortuous flow paths for transporting solar heated fluids or use heat transfer augmentation such as fins, projections, spirals, inserts, cups, cones, disks, baffles, screens, perforated plates and shells and air jets. Such collectors require large fans, blowers or pumps to overcome pressure drops created by inherent flow restrictions.

U.S. Pat. No. 4,403,600, incorporated herein by reference, shows a modular solar heating system capable of being retrofitted to a structure. Air is blown over two surfaces of a heat exchanger (absorber plate) via a divided air space through "slot-like" apertures. Slot resistance creates a pressure drop requiting a large fan and requires cutting a large opening in a building interior wall for a plenum to house the fan. Also, wooden frame construction can be detrimental during off-season periods such as late spring or summer when collector stagnation temperatures are known to approach kindling temperature of wood. Ultra-violet rays can cause degradation of the plastic sheet used in the rear of the collector. Due to inherent thermal inefficiencies, a 4 foot by 8 foot (1.22 m by 2.44 m) collector is used. The collector is large, bulky, difficult to manufacture, unsuitable for site assembly, difficult to install and thereby increases overall system cost.

U.S. Pat. No. 4,300,601, incorporated herein by reference, shows a vacuum valve and monitoring system for evacuated flat plate solar collector units. The device employs a ball switching device to automatically activate and operate a vacuum pump to restore vacuum in a system upon loss of vacuum. This configuration requires a permanently installed vacuum pump near the collector unless the unit is hermetically vacuum sealed.

U.S. Pat. No. 3,990,201, incorporated herein by reference, shows an evacuated dual glazing system of less than 0.25 inch (0.64 cm) spacing between panes. Such small spacing between glazings drastically reduces effective insulating benefits. The patent teaches that 0.25 inch (0.64 cm) spacing between panes is necessary for safety and that mica spacers placed 1 inch (2.54 cm) apart in checkerboard fashion reduce mechanical bending stresses due to atmospheric pressure. "Aluminizing" of interior glazings to minimize heat loss or gain is shown.

U.S. Pat. No. 4,201,195, incorporated herein by reference, utilizes air forced through numerous critically positioned perforations in a "jet plate." The air strikes a corrugated solar heated target absorber plate and transports heat along the channels. Corrugation increases target absorber plate surface area and collection efficiency. This design requires pumping to overcome resistance of the "jet plate." Collector construction does not favor easy manufacture or retrofit with a single stage module.

According to studies such as in "Popular Science," Jun., 1993, article: "Window Technology: Part One . . ." No Pane, No Gain" pages 92–98, very little major improvement in glazings or in window technology has occurred for thirty to forty years. Windows remained the same with wood or aluminum frames and glass panes. They let in too much cold in the winter and heat in the summer. To upgrade them, storm windows were added. In the last decade, changes such as coatings that let in light, but not heat; energy saving inert gas filling between panes; suspended plastic film; and heat stopping edge spacers have been used.

Types of insulated windows include:

1. Standard insulated glass: ½ inch (1.27 cm) air space; wood vinyl, or metal frame (with thermal break).

2. Low-e coating (emissivity=0.1 to 0.02): ½ inch (1.27 cm) space with argon gas fill; quality wood, vinyl or metal frame (with thermal break).

3. Spectrally selective soft coat low-e coating (emissivity=0.04) with low solar transmittance (such as Cardinal Low e2 made by Cardinal Insulated Glass, Minnetonka, Minn.): ½ inch (1.27 cm) space with argon gas fill; quality wood, vinyl or metal frame (with thermal break).

4. State-of-the-art superwindow (such as Hurd Insol-8, Pella InsulShield or Weather Shield Super Smart); triple glazing or two suspended films; two low-e coatings; argon or krypton gas fill; quality wood, vinyl or metal frame (with thermal break); very low air leakage.

Glazings perform several functions including transmitting light through them and to isolate the indoor or enclosure environment from outdoors. Most glass is transparent to sunlight. Solar energy moves in and out windows; however, radiative energy transfer occurs in several ways. Infrared radiation, a part of the solar spectrum, is transmitted directly through most windows heating the glass in the process. Heat absorbed is reradiated. Air rises near the warmer glass surface and falls along the cooler surface in the space between the panes by convection. These convection currents can transfer heat from one pane of glass to another. Conduction loss occurs when heat is conducted from the warmer to the cooler side of a window as each molecule excites its neighbor, passing the energy along. Conduction occurs through glass, window frames, and air or inert gas between glass layers. The tighter the window and the better weather stripping or seal, the lower is air leakage that occurs around and through windows and glazings. However, despite attempts at minimizing heat loss from windows, no highly efficient, cost effective window or glazing exists. Ten years ago the standard air space was ¼ inch (0.64 cm) wide. Simply increasing that width to ½ inch (1.27 cm) was reported to improve the R-value (a measure of resistance to heat flow) about 15% because heat has to travel a greater distance. However, when the space exceeds about ⅝ inch (1.59 cm), air can circulate by convection which causes heat loss. This loss can be further reduced by replacing air with a gas that transmits heat less efficiently. Such low conduction gases were first used in welded glass edge insulated glazing units more than twenty years ago by PPG Industries, Pittsburgh, Pa., according to Moe Peterson, Director of Product Development for flat glass at PPG. Libbey Owens Ford used chlorofluorocarbons (CFC's) and carbon dioxide in early products. Argon gas is used by Andersen Corporation of Bayport, Minn. in all of their insulated windows. Although carbon dioxide performs about as well as argon, it is more prone to leak. Sulphur hexafluoride and krypton are other options. Sulphur hexafluoride insulates somewhat better than argon, but the gas has a low viscosity—the molecules slide past each other more easily which means that sulphur hexafluoride begins convecting in spaces smaller than ¼ inch (0.64 cm). This gas performs better when mixed with argon. Krypton offers the lowest conductivity of any gas in use, and its moderately low viscosity keeps the optimal inter-glazing space around ¼ inch (0.64 cm). Unfortunately, this gas is also scarce and expensive. Hurd Millwork of Medford, Wis. and Pella Corporation of Pella, Iowa use krypton gas in a few multipane super-high-performance windows. Hurd also uses a mirrored film called Heat Mirror, developed by Southwall Technologies of Palo Alto, Calif., suspended between glass panes to provide an additional air space to slow heat loss. All these window glazing improvements reduced heat loss transmitted by the window thereby increasing the R-value compared to standard glass.

On pages 95 and 96, Tom Potter, at the National Renewable Energy Laboratory in Golden, Colo., says the most energy efficient option of all would be no gas, i.e. a vacuum. Research studies conducted in the mid-to-late 1980's showed very dramatic center-of-glass insulation levels of as high as R-15 with a ¹⁄₁₀ inch (0.25 cm) vacuum space. They report that little further work has been done recently on the technology. Vacuum glazings present many challenges, according to experts Potter and Dave Benson, the greatest being how to maintain the vacuum state. The only successful method demonstrated thus far is one that uses a continuous glass welded edge. Second, spacers must hold the panes of glass away from one another. Tiny glass beads were used in prototype panels, but they could distort the window view. Stresses on edges from differential thermal expansion of inner and outer panes of glass could potentially cause breakage, sending glass shards some distance. Informal lab testing did not show this to be the case, according to Potter. Higher strength tempered glass might prevent such breakage, but this type of glass so far cannot be welded for a vacuum seal, he says.

A need exists for a solar collector system that overcomes the problems and limitations associated with current solar collector systems.

SUMMARY OF THE INVENTION

An object of this invention is to provide an efficient solar heating system, adapted for original or retrofit installation in a building with minimal structural modification. The system utilizes a compact, light weight, aesthetic, solar collector unit capable of multiple installation for effective solar energy collection and utilization.

Another object of this invention is to provide an economical, easily manufactured, durable, reliable, solar heating system capable of easy on-site fabrication and installation, requiring minimal initial investment; has low operating and maintenance costs and results in a rapid payback.

Still another object is to provide a practical evacuated glazing which is easily maintained.

The present invention is a solar heater with a frame which has internally oriented projection for positioning a light transmissive cover, absorber plate, insulation and back to form an enclosure. The frame design and assembly method greatly facilitates manufacture and field servicing. In operation, solar energy passing through the cover heats the absorber plate and fluid beneath it. The light transmissive cover optionally utilizes vacuum technology to contain trapped solar energy in the device. The vacuum can be rapidly maintained and restored on-site, as-installed, without removing the collector.

A base, functions as an insulating heat barrier, closure for one face of the frame, absorber plate support, bearing surface for interior insulating walls, as flow conduit and closure for a solar heated fluid, and for transporting fluid from the hotter collector to a cooler space through an inlet and an outlet.

The collector is adaptable for single or multiple installation and is suitable for active or passive solar heating of a variety of fluids such as, but not limited to, air, water and oil and other materials. Multiple fluid heating for space and domestic hot water are disclosed.

The version of the light transmissive cover, with a vacuum sealably contained between panes, can be utilized alone as a window, wall, roof or other construction member in a greenhouse, house, barn, garage, and commercial or industrial building. The evacuated cover provides light transmission for illumination and solar heat gain as well as beneficial insulation.

BRIEF DESCRIPTION OF THE DRAWINGS

FIG. 2 is a top view of a solar device.

FIG. 3 is a cross sectional view of a solar device taken through cutting plane A—A of FIG. 2.

FIG. 6A is a cross sectional view of a non-extruded frame.

FIG. 8 is a cross sectional view of a multi-fluid collector.

FIG. 9A is a schematic for use in the embodiment of FIG. 8 for domestic hot water (DHW) heating.

FIG. 9B is a partial perspective view of a clamp and tube for use in the multi-fluid embodiment of FIG. 8.

FIG. 9C is a schematic for use in the embodiment of FIG. 8 for space heating (SH) with air from thermal energy storage (TES) such as a rock bin.

FIG. 11A and FIG. 11B are a partial top view and a partial cross sectional view of multiple solar collector linking.

DETAILED DESCRIPTION OF THE EMBODIMENTS

Figure 1:
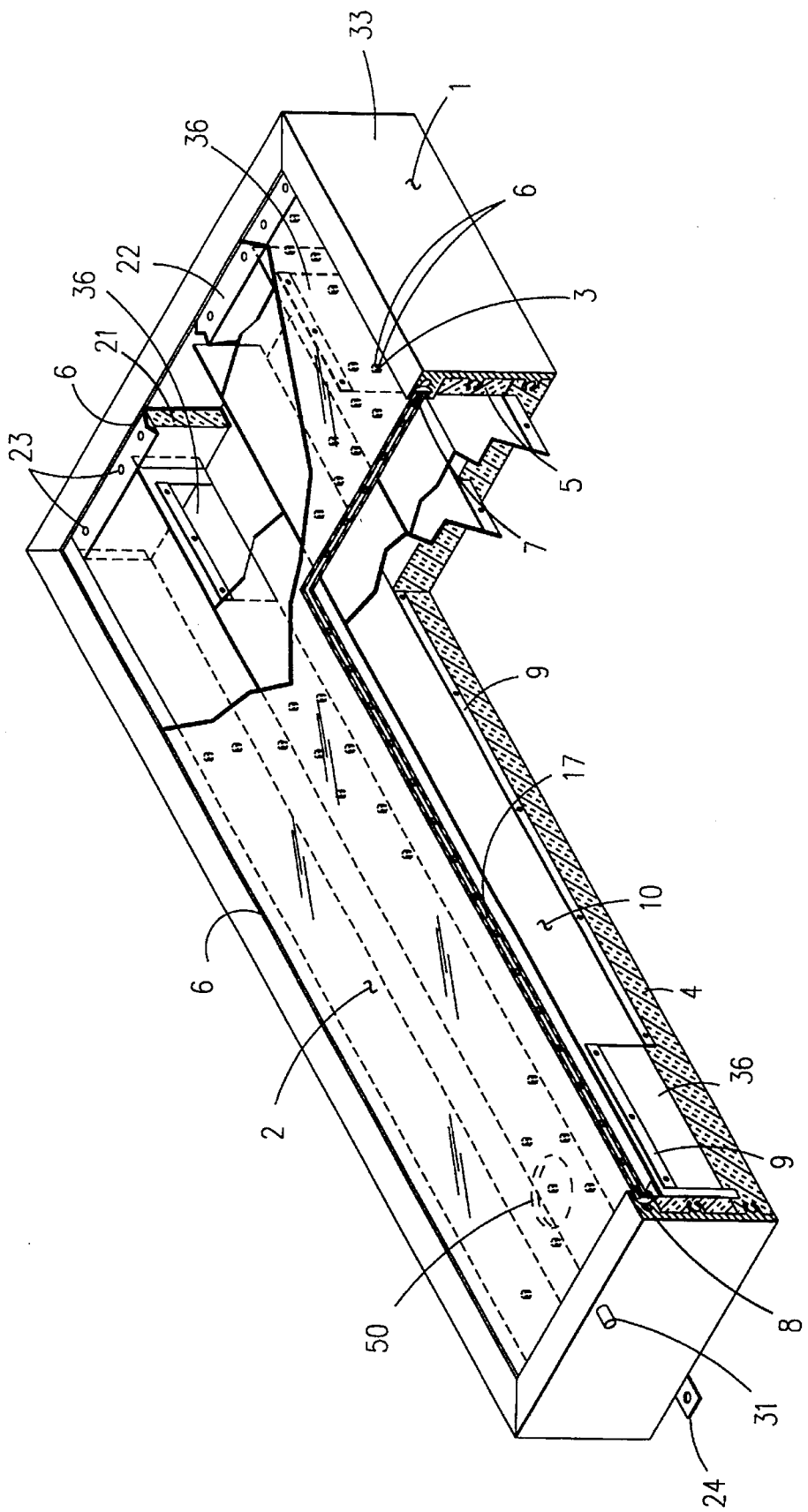
FIG. 1 is a cutaway perspective view of a solar device.

FIGS. 1–3 show a solar energy collector. Seen in cutaway perspective view of FIG. 1, the solar collector has a frame 1, back 4, absorber plate 10 and cover 2.

Figure 5:
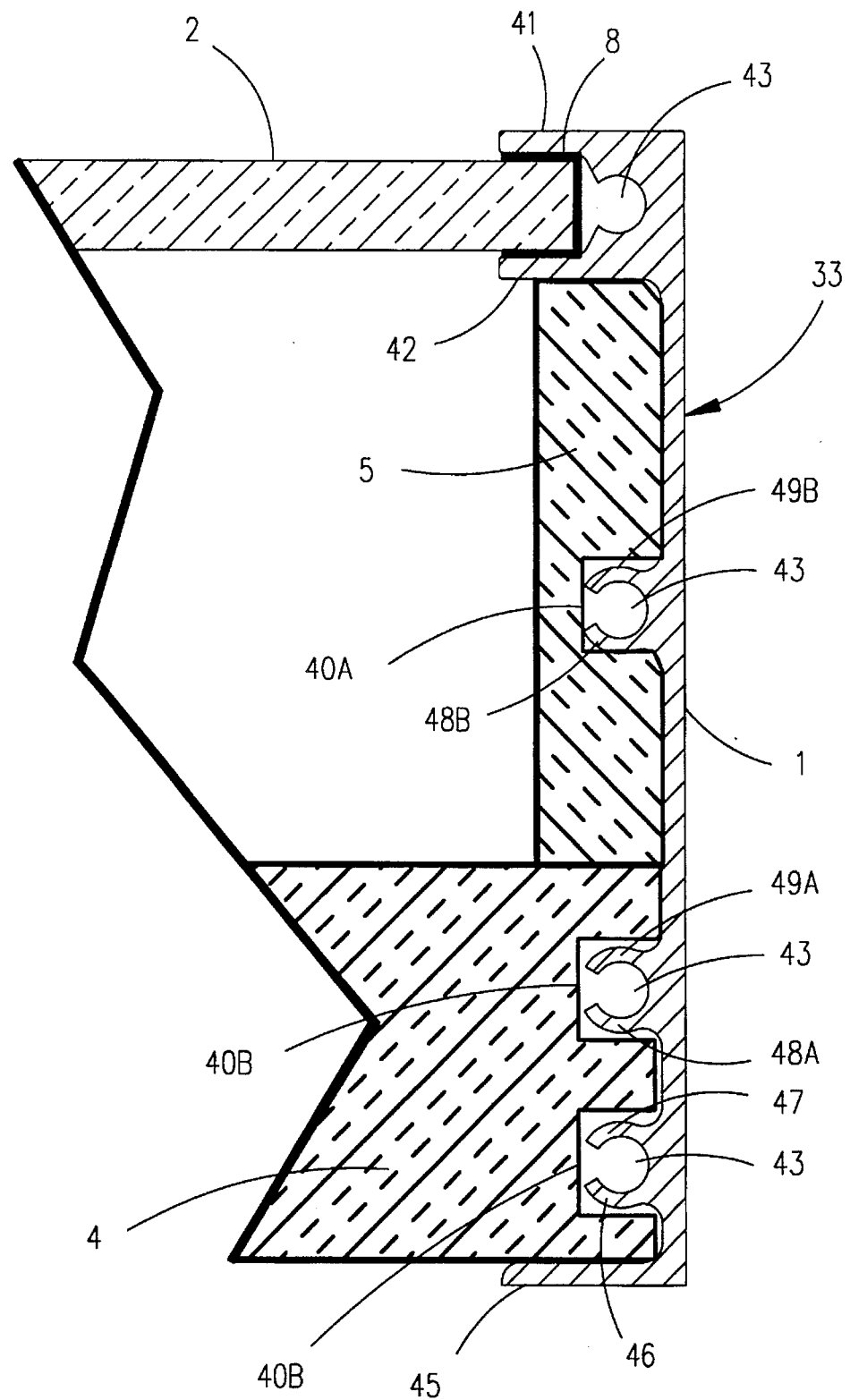
FIG. 5 is a partial cross sectional view of an extruded frame.

Frame 1, shown in FIG. 1 and in cross sectional detail in FIG. 5, is made by metal extrusion or mold, preferably aluminum extrusion; however, other metals and non-metal materials such as wood, plastic foam and insulation can also be used. The frame has projections 41 and 42 for attaching and sealing cover 2 with rubber gasket 8 to make a weatherproof connection. Taps 43, for screws, permit easy connecting of the four sides of the frame, either when manufactured or on-site, to form a solar collector unit. Presently, the taps 43 accommodate ¾ inch (1.91 cm) 8–32 screws. Collector size is 34 inches by 76 inches (86.36 cm by 193.04 cm) approximately 3 ft. by 6 ft. (0.91 m by 1.83 m). Frame 1 has skin 33 such as anodized black or paint for protection and resistance to the elements. Projections 48B and 49B on frame 1 fit into grooves 40A in wall 5 to secure it. Wall 5 is made from double sided foil backed rigid foam insulation. Projections 46 and 47 fit into grooves 40B in back 4; flange 45 further secures back 4 which is made from double-sided foil backed rigid insulation. Presently, ½ inch (1.27 cm) thick insulation is used for walls 5 and 2 inch (5.08 cm) is used for the back 4. Frame 1, so formed and asssembled, allows for easy assembly of the cover 2, walls 5 and back 4. Frame 1 can be fabricated as seen in FIG. 6 which is a cross-sectional view of an extruded frame for use in the embodiment of FIG. 3.

Figure 6:
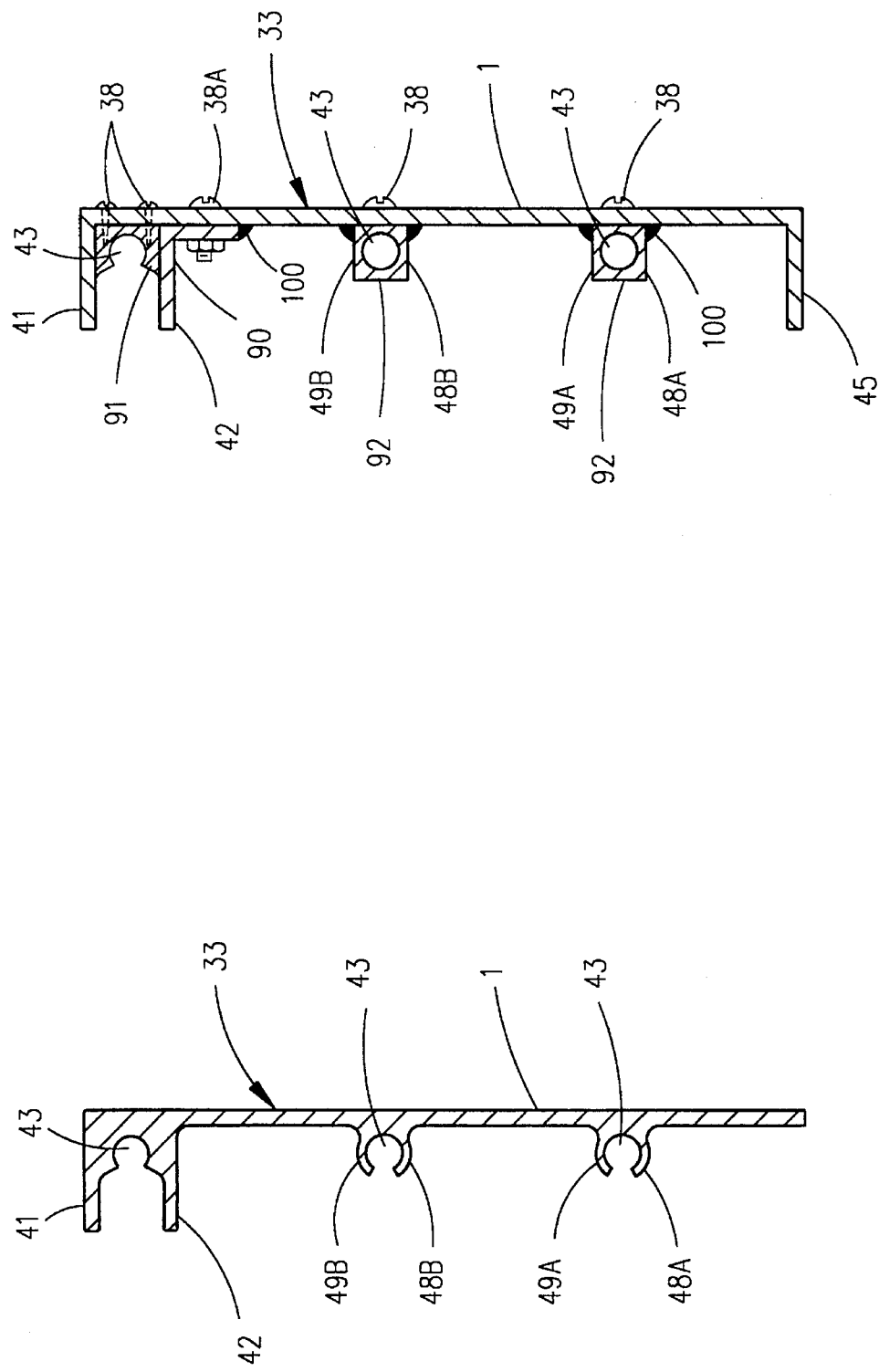
FIG. 6 is a cross sectional view of an extruded frame for use in the embodiment of FIG. 3.

Frame 1 can also be fabricated from non-extruded, separately attached components as seen in FIG. 6A which is a cross-sectional view of a non-extruded frame. The non-extruded frame is preferably bent from metal to form projections 41 and 45; optionally, frame 1 can be fabricated without projection 45 similar to the extruded frame shown in FIG. 6. Runner 91 secured to frame 1 with screws 38, is used for attaching and sealing cover 2 with rubber gasket 8 to make a weatherproof connection; angle 90, attached to the frame with fasteners 38A and welds 100, supports the cover 2. Bars 92, attached to the frame by welds 100, and screws 38 are used to support wall 5 and back 4 similar to the manner described for the frame of FIG. 5. Frame 1 has skin 33 such as anodized black or paint for protection and resistance to the elements. Taps 43 in angle 90, runner 91, and bars 92 allow for connecting the four sides of the frame with screws to form a solar collector unit.

The back 4 serves as an integral rear wall insulated section without need for a separate rear wall and insulation. The back reduces heat loss from solar heated fluids, such as air, aiding in transporting heated fluid from the solar unit to a dwelling or to a thermal energy storage medium, such as rock, sand, water, wax or eutectic salts for later utilization. The back 4 further serves as a thermal isolative barrier supporting an absorber plate 10 which drastically reduces conductive heat lost from the absorber plate 10.

Use of an integral insulative back 4 results in improved collector performance and lower manufactured cost.

As shown in FIGS. 2 and 3, the absorber plate 10, is fabricated from light gage metal such as 28 ga aluminum sheet stock. Copper can be used for domestic hot water. The plate is preferably furnished as a plurality of manageable "U-shaped" lengths rather than from single, bulky, sheets, coils or rolls of metal for convenient assembly at a small work station. Sections can be formed with standard sheet metal equipment rather than complicated dies and punches operated by large presses. Cutouts 36, approximately 2 inches by 10.25 inches (5.08 cm by 26.04 cm) are provided for air flow. Adjacent free edges of abutting individual "U"s are positioned into connector strips 9 made from light gage aluminum and preferably crimped to create an absorber plate 10. Screws, rivets or other fasteners can also be used. Connector strip 9 and absorber plate 10 are positioned into narrow grooves 37 approximately 1 to 4 metal thickness wide and about ½ inch (1.27 cm) deep longitudinally disposed along substantially the entire length of the interior surface of back 4, and sealably attached with an adhesive 6 such as RTV brand silicone rubber. The absorber plate 10, so arranged, establishes a plurality of fluid flow channels separably contained between the vertical wall of the "U-shaped" sections' horizontal inner face of the "U" and by the interior surface of back 4.

As seen in FIG. 2, the absorber plate 10 extends longitudinally substantially from bottom to top of frame 1. A cap 21, preferably made from double sided foil backed rigid foam insulation approximately ½ inch to 1 inch (1.27 cm to 2.54 cm) thick, and an enclosure 22 to which absorber plate 10 is attached with fasteners 23 such as "pop" rivets, screws or equivalent, for easy asssembly. Absorber plate 10 and interface including cap 21, enclosure 22 and base 4 are preferably sealed with an adhesive 6 to provide a fluid tight plenum; however, a fluid tight seal is not mandatory.

Figure 7:
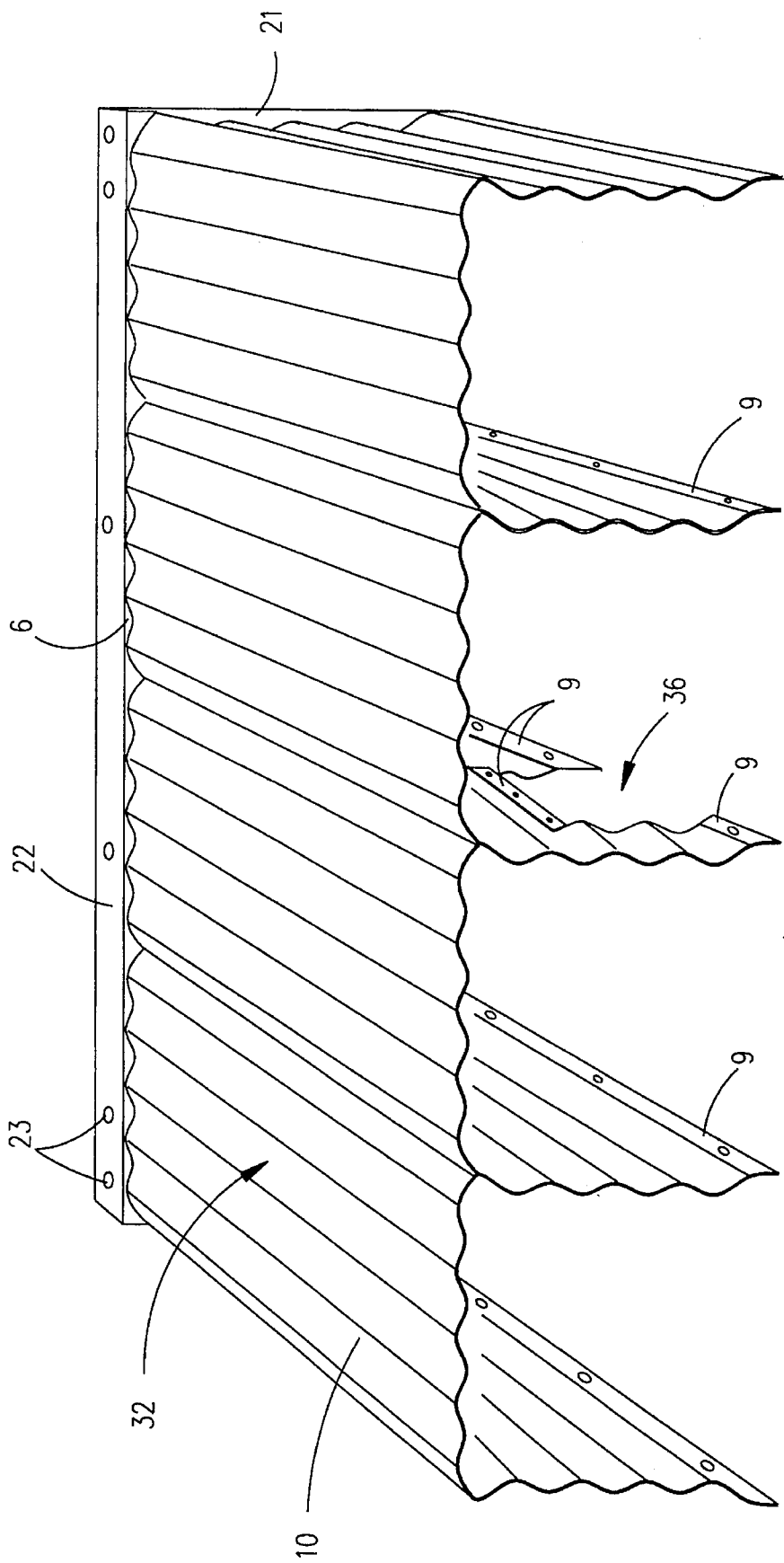
FIG. 7 is a partial perspective view of a corrugated absorber plate.

As seen in FIG. 3, the outer face of the absorber plate 10 has a coating 32 such as selective black paint for maximum solar absorptivity. Incident solar energy falling on the absorber plate and transfers heat to a fluid which is circulated either by a fan 13, by natural convection, or by blowers or pumps. To further enhance collector performance by providing additional surface area without increasing overall collector size, the absorber plate 10 can be corrugated as shown in FIG. 7. Fins or projections can also be incorporated internally or externally as required.

A solar collector was made, according to the invention, with a cover 2 constructed from one pane of 3/16 inch (0.48 cm) tempered, low iron glass, approx.<1%, anti-glare coated, 90% transmissibility.

To further minimize heat loss and to capture and utilize the maximum amount of useful solar energy collected in the collector, an evacuated cover 2 was constructed from two panes of 3/16 inch (0.48 cm) tempered, low iron glass, approximately<1%, anti-glare coated, 90% transmissibility. The first pane of the cover 2, seen in FIG. 3, is separated from the second pane approximately ½ inch to 4 inches (1.27 cm to 10.16 cm) by from 240 to 260 strategically disposed ¼ inch (0.64 cm) acrylic spacers 3 flexibly attached between the panes with adhesive 6 to form evacuated space 17 (see FIGS. 13 and 14). For a cover 2 measuring approximately 32 inches by 74 inches (81.28 cm by 187.96 cm) using 253 spacers was satisfactory. Flexible attachment of the spacers maintains the separation by allowing for thermal expansion between the panes which are at considerably different temperatures. Also, acrylic spacers 3 and adhesive 6 are softer and more flexible than harder and rigid materials such as mica or quartz.

Falbel in U.S. Pat. No. 3,990,201, installs mica spacers in an evacuated glazing of less than ¼ inch (0.64 cm), and suggests an implosion problem is due to the distance between the panes. The present invention, while possibly due to use of tempered glass, uses far fewer spacers, the distance between panes is much greater, and no implosions occurred. This leads to questioning of the assumptions in the Falbel patent. The present invention uses acrylic spacers with a flexible RTV sealant during installation, which cannot scratch the glass. The Falbel patent doesn't tell how mica spacers are supported during construction. Perhaps mica, a phyllosilicate having $K^+$ or $Ca^{++}$ and $Na^+$ between layers, when subject to pressure from the glass, vacuum tending to draw off any water formed (Lavoisier's Principle) and high temperature from solar placement, undergoes metamorphic change from a softer hydroxide to form a harder oxide. The glass, having a slight bend inward and a Mohs' scale hardness of 5.5 to 6, might be scratched by either an impurity in the mica or metamorphized mica during expansion and contraction due to thermal change. A scratch on an inner surface of stressed glass will cause the glass to shatter. Mica occurs as muscovite $KAl_3 Si_3 O_{10} (OH)_2$, phlogopite $K Mg_3 (AlSi_3 O_{10})(OH)_{10}$, and biotite $K (Mg, Fe)_3 (Al, Fe) Si_3 O_{10} (OH,F)_2$ and has a hardness of 2 to 3. The same elements are found in spinel (hardness 7.5 to 8), orthoclase, plagioclase (hardness 6), jadite (6.5 to 7), and kyanite (6.7), all of which might scratch window glass. It is theoretically possible to form a mineral like these from mica. Indeed, oligoclase (a form of plagioclase) occurs in the Hawk Mica Mine, Mitchell Co., N.C. Thus, it is felt that spacers should be formed from a material which maintains a lesser degree of hardness than glass under conditions of high contact presssure, solar radiation, high temperature, and partial vacuum. This would allow a spacer imitative of a muntin to be used. Acrylic spacers flexibly attached to the panes with adhesive 6 cannot rub or score and create stress concentrations on the contact surfaces of the panes of glass thereby minimizing glass breakage. The cover 2 is supported along the perimeter by a seal 7 of silicone rubber which is attached to the panes with adhesive 6. The evacuated space 17 between the panes of the cover 2 is evacuated to 29.92 in hg. This provides a heat loss barrier allowing solar energy to easily pass through light transmissive cover 2 thereby greatly increasing solar collector efficiency.

Other glazings such as at least one non-evacuated cover such as low iron,<1%, 90% transmissibility tempered glass, double-pane glass filled with gas such as air, carbon dioxide, argon, or krypton; various low emissivity (low-e) coatings on single or multiple pane glass surfaces, durable metal oxides that are fused into the surface of the glass such as pyrolytic (hard coat) low-e, interior reflective metal coating on a pane in a sealed trait deposited in a vacuum such as sputtered (soft-coat) low-e, and plastic covers may be used.

The solar device shown in FIG. 1, can be assembled as follows:

Using three of four frame extrusions frame 1 is partially assembled, loosely using screws, into a "C" or "U" shape. By partially assembling the frame, an access opening is available for inserting the solar collector components into the frame after which the remaining frame extrusion is used to close the opening, thereby, forming the completed frame 1. Also, the non-extruded frame of FIG. 6A can be used.

Next, back 4 is provided with grooves 37 and 40B for accomodating the absorber plate 10, and for positioning and engaging frame 1. Also, openings 50 and 51 for sleeve 11, shroud 12, fan 13 and motor 14 are provided.

The absorber plate 10 plate is preferably furnished as a plurality of manageable "U-shaped" lengths. The outer face of the absorber plate 10 has a coating 32 such as selective black paint for maximum solar absorptivity. The inner free edges of the individual "U"s are positioned into connector strips 9 which are made from light gage aluminum and preferably crimped to create an absorber plate 10. Screws, rivets or other fasteners can also be used. Connector strip 9 and absorber plate 10 are positioned into narrow grooves 37 approximately 1 to 4 metal thickness wide and about ½ inch (1.27 cm) deep longitudinally disposed along substantially the entire length of the interior surface of back 4, and sealably attached with an adhesive 6 such as RTV brand silicone rubber. A cap 21, preferably made from double-sided foil backed rigid foam insulation approximately ½ inch to 1 inch (1.27 cm to 2.54 cm) thick, and an enclosure 22 to which absorber plate 10 is attached with fasteners 23 such as "pop" rivets, screws or equivalent, for easy asssembly. Absorber plate 10 and interface including cap 21, enclosure 22 and base 4 are preferably sealed with an adhesive 6 to provide a fluid tight plenum; however, a fluid tight seal is not mandatory. The absorber plate 10 and back 4 assembly is guided through the frame opening by the perimeter grooves 40B in back 4 which engage projections of the frame.

Wall 5 is provided with groove 40A along the wider face, to permit vertical placement between the interior surface of base 4 and to engage and secure projections 48B and 49B of frame 1 with adhesive 6.

Next, gasket 8 is positioned into projections 41 and 42 on frame 1 for accommodating the cover 2.

RTV brand silicone rubber adhesive 6 is placed on the perimeter near the edge on both surfaces of the glazing of provided cover 2. The cover 2 is then guided into projections on frame 1 sealably contacting the gasket 8.

The remaining frame extrusion section is positioned and attached with screws to the other three frame extrusions thereby forming completed frame 1.

Finishing is done as follows:

As seen in FIG. 3, rubber sleeve 11, is installed in the fluid inlet 50 and outlet 51 openings in back 4 and is secured to back 4 with adhesive 6; by reaching through openings 50 and 51, temperature sensors 18 an 19 are fastened to the interior surfaces of absorber plate 10 and electrically connected to motor 14. Next, an assembly consisting of shroud 12 containing fan 13, motor 14, cord 15 and bracket 16 is installed into the fluid inlet and outlet oppenings in back 4. Shroud 12 fits snugly into sleeve 11 and is further secured to back 4 with screws 38. Finally, tabs 24 shown in FIGS. 1 and 2 are attached to frame 1 with fasteners to facilitate mounting during installation.

For multiple collector linking, as seen in FIG. 11A and B, adapter 60 and thermal barrier 61 and openings in absorber plate 10, wall 5 and frame 1 are provided. Back 4, is adapted for linking by appropriate positioning of inlet opening 50 and outlet opening 51. Adhesive 6 is placed on the outer surfaces of thermal barrier 61. Adapter 60 and thermal barrier 61 passes through the wall of absorber plate 10 of the first collector where it is secured with fasteners 23. By extending into the second collector, a path for the heated discharge air from the first collector is created. The air enters the second collector, and is drawn out the second collector with fan 13. For multiple linking applications, component installation is similar to the assembly procedure described earlier for the single solar collector.

Figure 10:
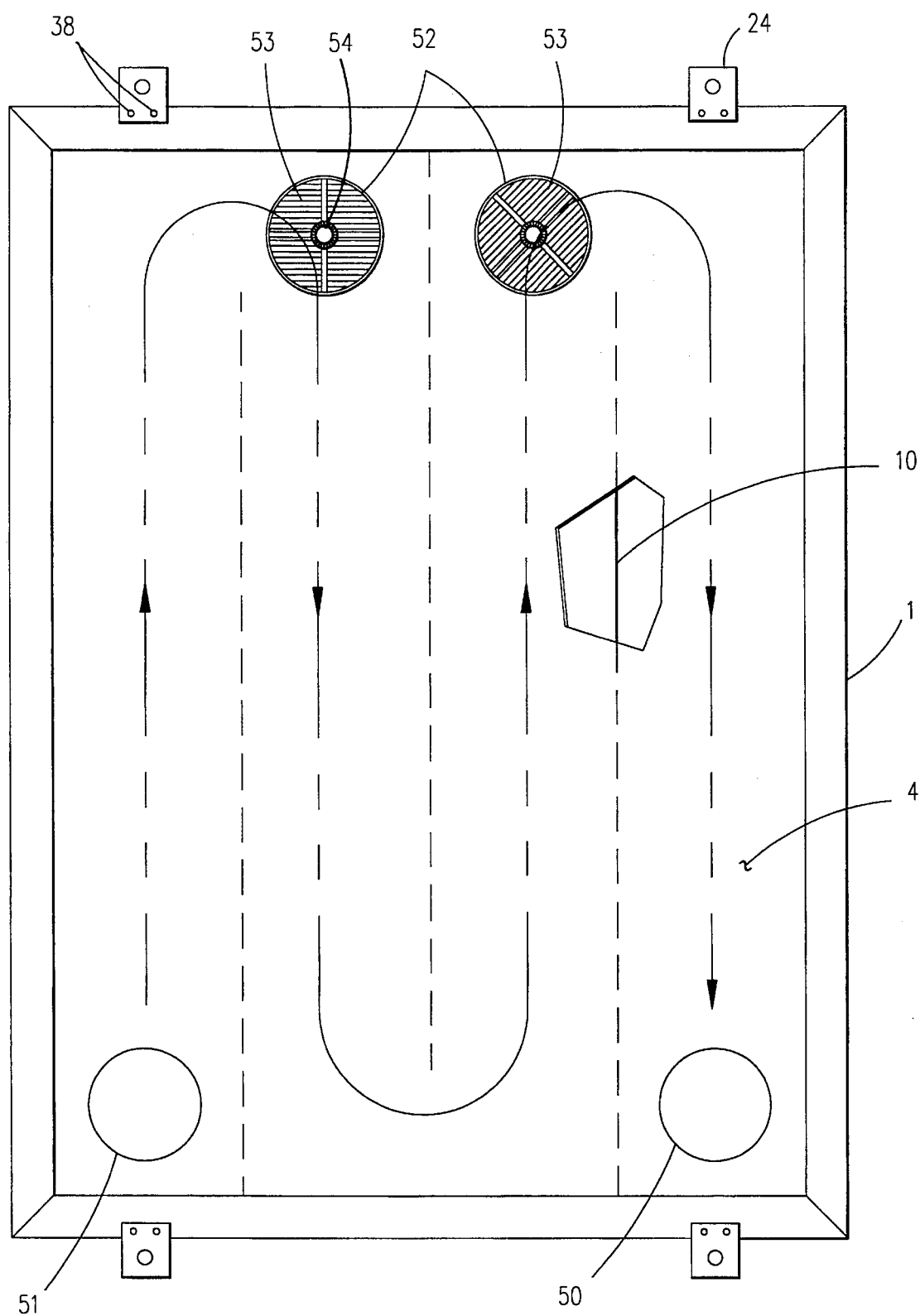
FIG. 10 is a back view of a solar device for use as active and passive direct space heating.

For active direct solar heating of air, shown in FIG. 3, a fan 13, having 5 blades and driven by a sub-fractional HP shade pole motor such as Dayton 4M068 J238-050-5178, 115 VAC; 0.32 amp 60 HZ 1500 RPM or equivalent DC motor, is mounted on a bracket 16 and the assembly is attached into a shroud 12 fabricated from 6¼ inch dia OD (15.88 cm) ¼ inch (0.64 cm) wall PVC plastic tube. The back 4, has two, approximately 6½ inch (16.51 cm) diameter openings positioned, in this embodiment, near the bottom of the solar collector. These openings, 50, 51, serve as inlet 50 and outlet 51 for fluids to be heated by solar energy. Additional openings, ports 52, can be provided for passive heating as shown in FIG. 10. A resilient sleeve 11 made from neoprene rubber is fitted into the openings and is attached to the back 4 with adhesive 6.

The shroud 12 contains a fan 13 and motor 14 and is positioned into outlet 51 in back 4 through a sleeve 11 and fastened to the back 4 with screws 38. A power cord 15, electrically connected to a motor 14 transports power from a voltage source such as 115–120 VAC in this embodiment. A fan/motor can be adapted to operate on photovoltaic solar cells or other D.C. power sources. Shroud 12 installed in the back 4 allows easy servicing of the motor 14 and fan 13. The rubber sleeve 11 also serves as a vibration and sound damper.

As shown in FIG. 3, the motor 14 and fan 13 are controlled by a differential temperature control which compares the temperature difference of the absorber plate and fluid inlet 50. This is achieved by an inlet temperature sensor 18 located on absorber plate 10 inner wall near fluid inlet opening 50 in back 4; and absorber plate temperature sensor 19 located on absorber plate 10 interior horizontal wall near fluid outlet opening 51 in back 4 for easy access. In operation, when solar energy is available and heating is needed, a differential temperature control activates the motor 14 and fan 13 to provide solar heating. When the sun is shining and the target space is cool, and the absorber plate 10 becomes hotter than the room, the differential temperature control activates and operates fan 13. Appropriate differential control settings minimize frequent fan cycling. The fan 13 draws out heated air (a fluid) through openings 51 and, due to its low horsepower motor 14, power consumption is minimal.

Flow through the solar collector as indicated in FIGS. 1 and 2 is such that the inlet fluid is sequentially drawn, without short circuiting, through each channel of the absorber plate 10 "U" sections which acts as a fluid directing baffle. Three cut outs 36 rectangularly shaped approximately 2 inches by 10.25 inches (5.08 cm by 26.04 cm) are alternately disposed along the length of the "U" sections to provide a uniform flow path along the wetted perimeter thereby scrubbing maximum solar heat from the heated surfaces of the absorber plate 10.

The described embodiment is a single solar unit for direct space heating without thermal energy storage. The single unit is adaptable to multiple unit installations as seen in FIGS. 12A and 12B by linking several collectors when additional heating is required.

For multiple collector linking, as seen in FIGS. 11A and 11B, adapter 60 and thermal barrier 61 and openings in absorber plate 10, wall 5 and frame 1 are provided. Back 4 is adapted for linking by appropriate positioning of inlet opening 50 and outlet opening 51. Adhesive 6 is placed on the outer surfaces of thermal barrier 61. Adapter 60 and thermal barrier 61 passes through the wall of absorber plate 10 of the first collector where it is secured with fasteners 23. By extending into the second collector, a path for the heated discharge air from the first collector is created. The air enters the second collector, and is drawn out the second collector with fan 13. For multiple linking applications, component installation is similar to the assembly procedure described earlier for the single solar collector. As seen in FIG. 11, collectors can be connected with link 62 and clip 63 which are attached with screws 38 to frame 1.

Collectors may be series linked as described or with flexible insulated ducts. The single fan 13 draws heated solar air sequentially through all of the absorber plate 10 "U" sections so connected. For linking more than 4 collectors, a larger capacity fan is required. Parallel arrays of multiple collectors, coupled to common manifold and duct configurations can also be used. Multiple collectors can also be adapted to multiple fluid heating as further described such as domestic hot water, swimming pool heating, space heating with air and industrial process fluid heating.

Figure 4:
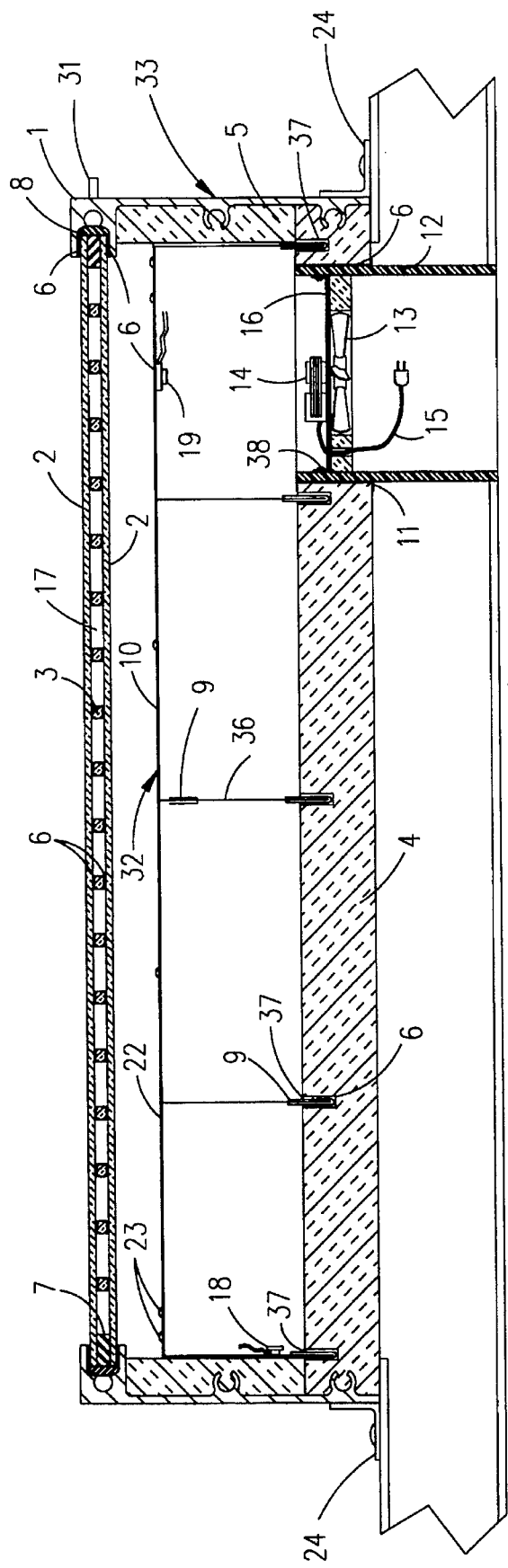
FIG. 4 is a cross sectional view of a solar device as installed on a structure.
Figure 12B:
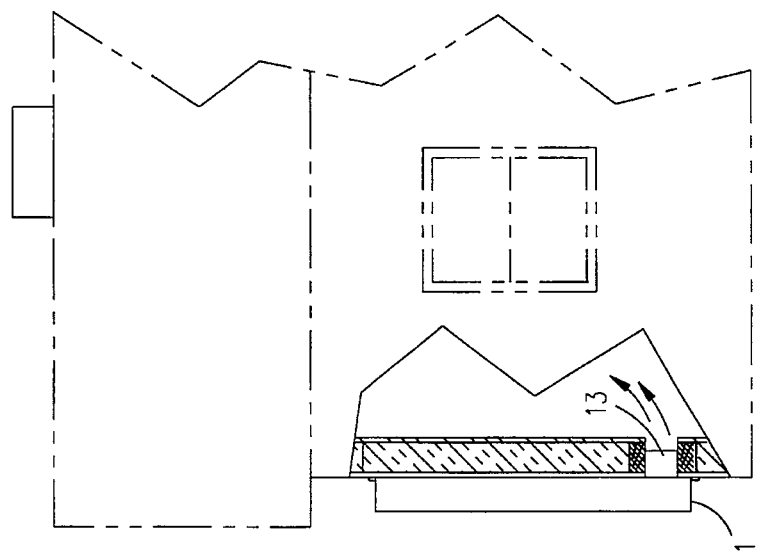
FIG. 12A and FIG. 12B are a front and side view of single and multiple solar collectors installed on a structure.
Figure 12A:
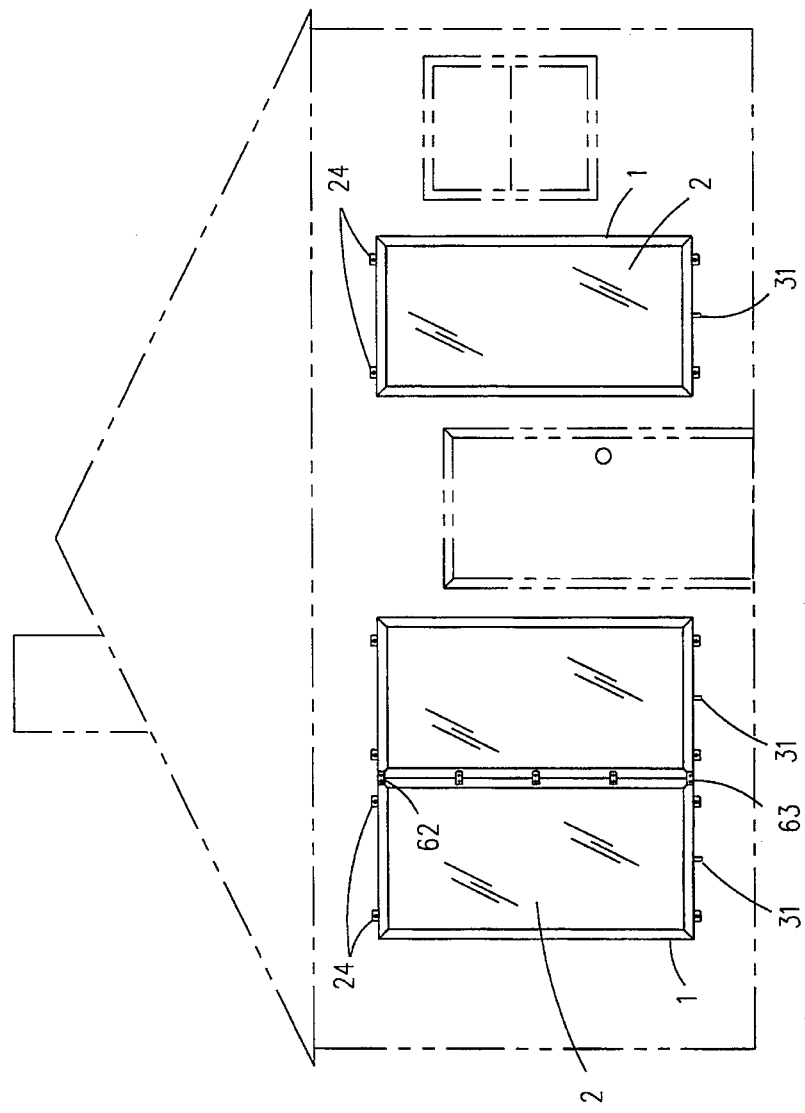

FIG. 4 and FIGS. 12A and 12B show the solar device vertically mounted on the exterior wall of a structure to provide direct space heating with air. Other mounting schemes can also be employed including, but not limited to horizontal, angled, ground, roof, fence and interior arrangements.

The solar collector can also heat multiple fluids such as air and water heat exchange.

Such an embodiment is a combination space/domestic hot water solar collection and utilization system. As seen in FIG. 8 and in FIGS. 9A and 9B, the solar collector can also have copper tubes 70 with selectively black coating 32 preferably formed into a serpentine shape. Heat transfer cement 72 is applied to the contact surfaces of clamp 71 to which copper tubes 70 are placed. This is done to improve thermal heat transfer from absorber plate 10 to which the clamp 71 with the tubes 70 are attached. Preferably, the absorber plate 10, for water heating, is made from copper for improved heat transfer and to allow soldering of the clamp 71 to the absorber plate 10. Other absorber plate materials can be used such as aluminum; clamp 71 may be secured to the absorber plate for difficult to solder applications with fasteners 23.

Mounting the clamp 71 and tubes 70 on the inner wall, in the "U" channel of absorber plate 10 as seen in FIG. 8 and in FIG. 9A, results in the fluid contained and circulated in tubes 70, to benefit from the heated air in the "U" channels of the absorber plate 10. The combined heat transfer effect of conduction from the solar heated absorber plate 10 to the tubes 70 which directly contact it and convection from the hot air surrounding the tubes 70 efficiently heats the fluid such as water or glycol.

Tubes 70 can also have fins to further increase heat transfer from the hotter air to the cooler fluid and can be mounted on the outer horizontal wall surfaces of absorber plate 10 where they are directly exposed to incident solar energy passing through the cover 2 of the solar collector. For year-round domestic hot water heating, circulating thermal fluid such as glycol with pump 80 through heat exchanger 81 located in water storage tank 73 can be achieved with the solar collector invention as seen in FIG. 9A. Standard plumbing and solar components such as fill valve 74, bleed valve 75, check valve 76, drain valve 77 differential temperature control 20, water storage tank 82 are used. Direct circulation of potable water, without heat exchanger 81, where there is no danger of freezing or for seasonal operation with draining provisions such as valve 77 can be used for domestic water heating; in the fall, the water from the tubes 70 is drained to avoid freezing and the space heating mode of operation is used. The solar collector fan 13 shown in FIG. 8 is then used to draw solar heated air into the dwelling for direct space heating. If desired, a variety of other thermal energy storage methods and materials such as rocks, sand, oils, chemicals, waxes, eutectic phase change materials can be used with the solar invention. A rock bin thermal energy storage system 83 for space heating is seen in FIG. 9C. In operation, as seen in FIG. 9C, when no direct space heating is needed, solar heated air provided by the invention is continuously circulated through the rock bin 83 thereby transfering heat to the rocks for use during non-solar days or at night can be integrated into the solar device. This is accomplished by utilizing air handling controller 79 and blower 78 together with standard heating and air conditioning controls, ducts and accessories.

The combination air/water embodiment can be adapted to swimming pool heating. A black plastic pipe can be clamped to the absorber plate 10 through which pool water is circulated using an existing pool pump and filtration system. A single non-evacuated glazing such as plastic or glass can be employed since only a small temperature rise, about 10–20 degrees F of the pool water is needed for comfort.

Similar combination space/fluid embodiments as seen in FIG. 8 and in FIGS. 9A, 9B and 9C, can be used for industrial process fluid heating. Solar units can be adjustably mounted and oriented normal to incoming solar rays to advantageously utilize solar energy for all season fluid heating as needed.

The solar unit as seen in FIG. 10 can be adapted for passive mode, that is without any external power source for air heating, for instance, by adapting the inlet opening 50 and outlet opening 51 in back 4 so that cool air enters the solar unit at bottom locations 50, 51 (floor level of a dwelling), flows upward toward the top of the collector outlet ports 52 and returning heated fluid to a dwelling thereby circulating solar heated air by thermosyphon, natural convection, or the chimney-effect.

The solar unit shown in FIGS. 1 to 3, when originally equipped with fan 13, can be normally operated in the active mode; also, if desired, the solar invention can be adapted to operate either in active or passive modes.

Passive operation, even with fan 13 installed, is possible. This is achieved by adapting the inlet opening 50 and outlet opening 51 in back 4, as seen in FIG. 10, so that cool air enters the solar unit at bottom locations 50, 51 (floor level of a dwelling), flows upward toward the top of the collector outlet ports 52 and returning heated fluid by natural convection to a dwelling.

Air flow control is achieved with louver 53, seen in FIG. 10, which is installed into ports 52. Rotating knob 54, which is coupled to louver 53, either opens or closes the louvers. When louver 53 is closed, no air circulates through ports 52, such as during normal active operation with fan 13. When louver 53 is open, such as during a power outage or when fan 13 operation is not wanted, air circulates freely by natural convection.

EXPERIMENTAL TEST 1

Prototype covers, approximately 32 inches by 74 inches (81.28 cm by 187.96 cm) used without the frame, collector and backing having a ½-inch (1.27 cm) vacuum space disposed between two panes of 3/16-inch (0.48 cm) glass fabricated and assembled according to the disclosed invention were installed on a southern exposed greenhouse located in Methuen, Mass. (latitude 42 degrees, 22 minutes). During the winter, the covers eliminated the need for an additional heat source. Very little vacuum loss was experienced (about 2 inches hg) after a six-month test period.

EXPERIMENTAL TEST 2

Figure 13:
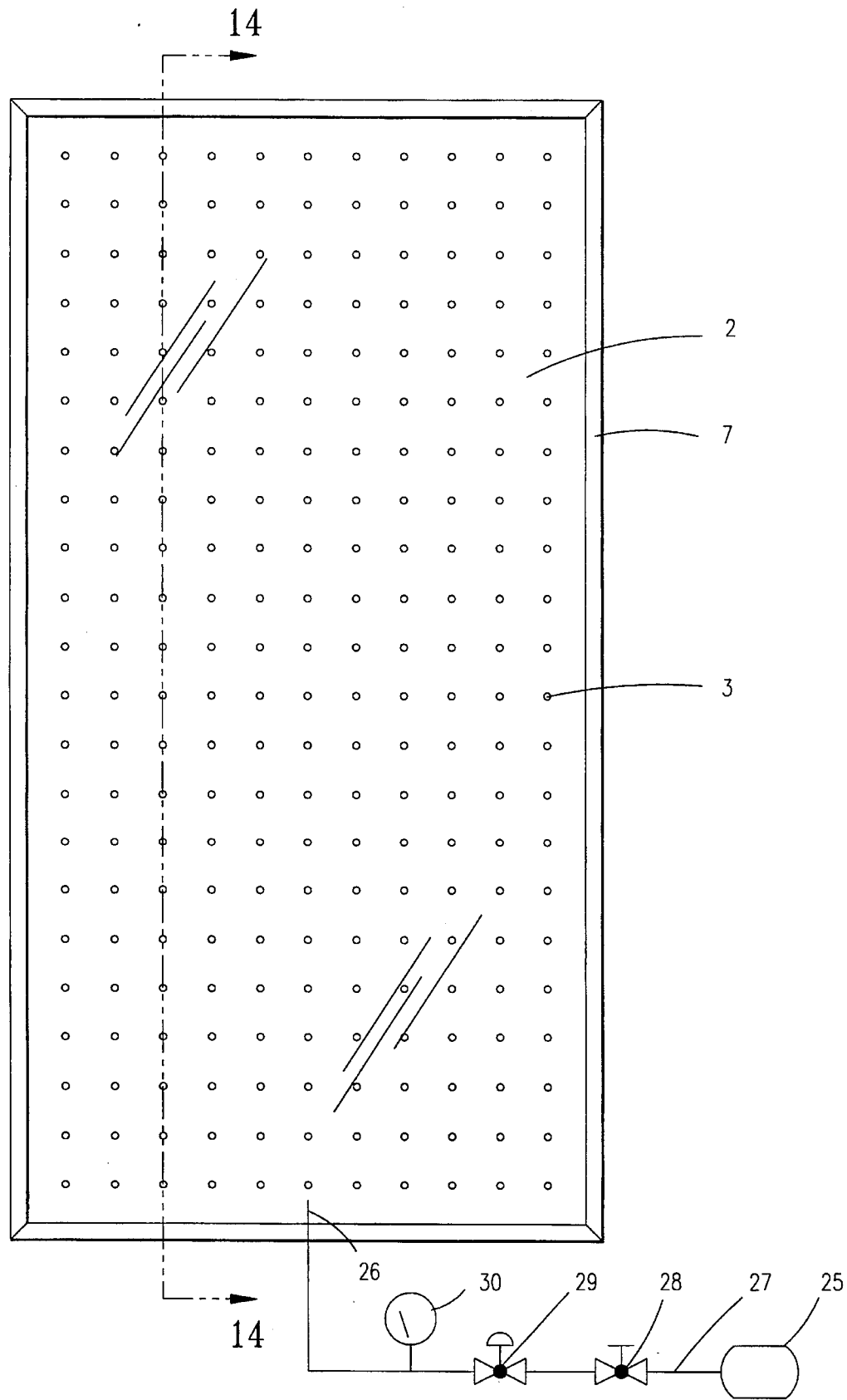
FIG. 13 is a front schematic view of a cover and a vacuum service kit.
Figure 14:
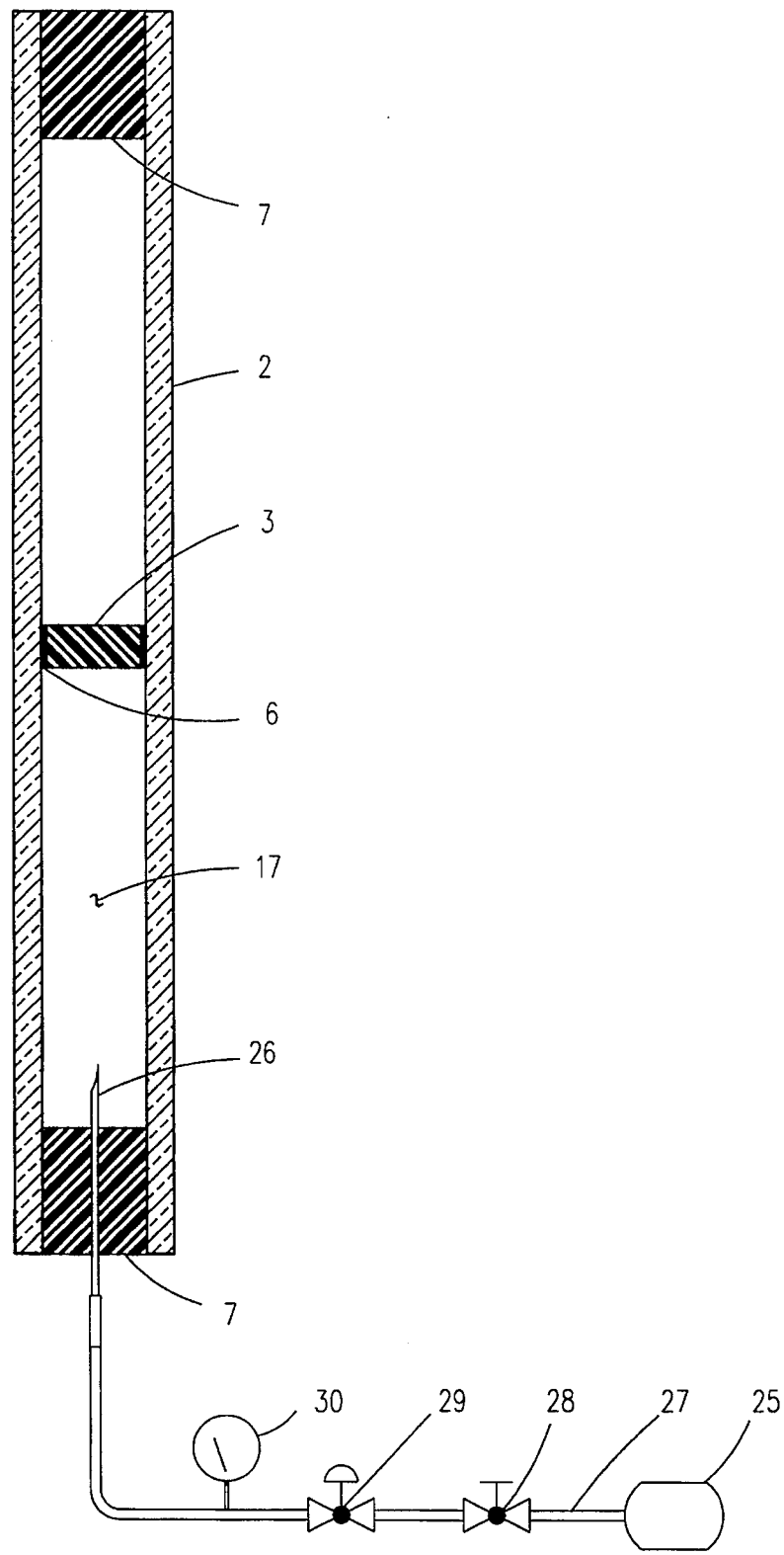
FIG. 14 is a side sectional schematic view of a cover and a vacuum service kit.

A vacuum service kit is shown in FIGS. 13 and 14 consisting of vacuum tank 25, probe 26, vacuum line 27 and valve 28, regulator 29 and vacuum gage 30. Probe 26 is hollow needle-like for making as small a hole as possible in seal 7. The prototype cover 2 of Experimental Test 1 had the vacuum restored in a few seconds after inserting probe 26 into seal 7 and penetrating it to access evacuated space 17 and evacuating it thereby re-establishing the original vacuum level without disrupting greenhouse operation. The small needle-like hole created by probe 26 upon entry into seal 7 is self-sealing upon withdrawl due to the properties of the silicone rubber material.

For a solar collector, access to service the evacuated space 17 is provided by a tap. Tap 31, as seen in FIG. 1, is located on frame 1 in the vicinity of cover 2. It is utilized for providing access to evacuated space 17 for penetration of gasket 8 and seal 7, and evacuating it thereby re-establishing the original vacuum level without disrupting solar collector operation. Since vacuum loss during experimental tests is small, only periodic (six-month to one-year) routine service or maintenance of evacuated space 17 is sufficient during normal collector operating conditions. Also, vacuum tank 25, could be exchanged for the combinations of Steinberg described in U.S. Pat. No. 4,300,601.

EXPERIMENTAL TEST 3

Evacuated covers having spacing of 3.00 inches (7.62 cm), greatly in excess 0.25 inches (0.64 cm) were made as described. Contrary to the teachings of Falbel in U.S. Pat. No. 3,990,201, even when rocks were hurled onto the covers, surprisingly, the glazings did not break or implode. Also, the larger evacuated spaces, contrary to the 0.25 inches (0.64 cm) space taught by Falbel are maintained due to design, placement, attachment and quantity of spacers in the present invention during normal operating conditions as well as during sudden impact without adverse mechanical stress damage. In the test evacuated cover of Experimental Test 3, 253 acrylic spacers spaced 3 inches (7.62 cm) apart were flexibly attached between the glazings with adhesive 6 as seen in FIGS. 13 and 14. This allowed for thermal expansion between the hotter inner glass surface and the external outer glass surface that was subjected to below freezing temperatures. Also, acrylic spacers 3 and adhesive 6, are softer and more flexible than harder and rigid materials such as mica or quartz. Acrylic spacers flexibly attached to the panes with adhesive 6 did not rub or score and create stress concentrations on the contact surfaces of the panes of glass thereby eliminating glass breakage. Utilizing 3/16 inch (0.48 cm) tempered glass also provided strength and impact resistence.

EXPERIMENTAL TEST 4

An experimental solar collector having a non-evacuated cover built according to the invention and mounted on a southern exposure vertical wall of a barn, was evaluated for material degradation and effect on collector performance. No adverse affects were observed; the solar unit operates as when originally installed.

EXPERIMENTAL TEST 5

To evaluate fabrication and solar unit assembly techniques, various frame designs were designed and fabricated. Two different frames were extruded from aluminum. The first frame design is shown in FIG. 5 while the second frame design is shown in FIG. 6. The basic difference between the two frame designs is that the first design shown in FIG. 5 has projections 46 and 47 and a 90 degree flange section 45 to better capture and support back 4 of the collector unit. This design was found to facilitate solar collector assembly. The design of FIG. 6, having a straight section without a 90-degree flange can also be used for making the solar unit; non-extruded, rather, separately attached components as seen in FIG. 6A, although labor intensive, can be utilized to make a frame; however, one-piece mill run length extrusions can be more economically manufactured. By cutting the extrusions to size, drilling, tapping and then selectively coating them greatly simplifies and speeds up assembly.

Applications include, but are not limited to, commercial, industrial and residential uses. These vary from space heating a single room in a dwelling to domestic hot water heating for a home, office or a commercial laundry or commercial carwash establishment. Photovoltaic solar cells can be utilized to operate a suitable motor and pump. D.C. systems can be used in remote areas, during power outages or peak electrical demand periods.

The embodiments described are typical and illustrative of the variations, combinations and permutations possible with the disclosed invention. It is not the intent to restrict or limit this disclosure only to those described, rather to demonstrate the wide spectrum of solar heating applications that could be embodied from the inventive concepts described herein.

What is claimed is:

1. A solar collector comprising:
   at least one frame member, having a plurality of centrally directed projections;
   said member having front and back edges;
   a back, having a surface substantially flush with said back edge and at an least one adjacent surface supported by said frame member projections;
   an absorber plate, having inner and outer faces; the outer face of said absorber plate being receptive to absorption of radiant energy being located frontward of said back; and, at least a portion inner face of said absorber plate positioned frontward of said back to form a cavity; and
   a light transmissive cover attached frontward of said plate and engaged by projections in said frame member.

2. The solar collector of claim 1, wherein said frame member is extruded.

3. The solar collector of claim 1, wherein said frame member is made from a rigid material chosen from the group consisting of metals, alloys, plastics, non-metals, wood, paper, insulation or fibers.

4. The solar collector of claim 1, wherein said member has at least one energy absorptive coating.

5. The solar collector of claim 4, wherein said coating is selected from the group consisting of paints, chemical depositions, vapor sprays or vapor depositions.

6. The solar collector of claim 2, wherein said frame further comprises:
a flange for retaining said back.

7. The solar device of claim 1, further comprising an elastomeric sealant between said cover and said frame.

8. The solar device of claim 1, wherein said frame further comprises a plate.

9. The solar collector of claim 8, wherein said plate has detachable means for containing said base and said light transmissive cover.

10. The solar collector of claim 1, wherein said light transmissive cover further comprises:
   at least two transmissive panels;
   at least one spacer positioned between said panels to form a gap;
   a resilient seal disposed around the perimeter of said panels to seal said gap; and
   means for evacuating said gap.

11. The solar device of claim 10 wherein said panels are chosen from the group consisting of plastic or glass.

12. The solar collector of claim 10, wherein said panels are low iron, <1%, tempered glass having a transmissibility of approximately 90%.

13. The solar collector of claim 10, wherein said gap is variable from 0.50 inches (1.27 cm) to approximately 4 inches (10.16 cm).

14. The solar collector of claim 10, wherein said spacers are flexibly attached between said panels.

15. The solar collector of claim 10, wherein said spacers are made from a material maintaining a hardness less than glass during use.

16. The solar collector of claim 10, wherein said means for evacuating said gap comprises a vacuum source chosen from the group consisting of evacuated containers and vacuum pumps.

17. The solar collector of claim 1, wherein said back is formed from rigid insulation and has openings disposed therein and means for transporting heated fluid from the enclosure contained therein.

18. The solar collector of claim 1, wherein said absorber plate further comprises at least one U-shaped channel having the outer face of said channel selectively biased to become absorptivity receptive to solar radiation.

19. The solar collector of claim 18, wherein at least one face of said U-shaped channel has at least one opening for transporting and directing fluid.

20. The solar collector of claim 18, further comprises a fan.

21. A method of manufacturing a solar collector having a frame comprising the steps of:
   installing an absorber plate into a back;
   placing said back into a frame section;
   engaging a glazing into inward projections of said frame section above said back; and
   completing said frame.

* * * * *